United States Patent [19]

Veré et al.

[11] Patent Number: 4,646,431

[45] Date of Patent: Mar. 3, 1987

[54] DEVICE FOR POSITIONING HAIR PIN SPRINGS ON PLATES, MORE ESPECIALLY FOR FUEL ASSEMBLY GRIDS

[75] Inventors: Bernard Veré, Eybens; Paul Mathevon, Bollene, both of France

[73] Assignee: Societe COGEMA, Velizy Villacoublay, France

[21] Appl. No.: 732,548

[22] Filed: May 10, 1985

[30] Foreign Application Priority Data

May 10, 1984 [FR] France ................. 84 07220

[51] Int. Cl.⁴ .................. B23P 19/00; B23P 17/00
[52] U.S. Cl. .................... 29/723; 29/400 N
[58] Field of Search ............ 29/513, 514, 521, 809, 29/810, 814, 818, 911; 376/414, 429, 438, 448, 449

[56] References Cited

U.S. PATENT DOCUMENTS 4,079,497  3/1978  Jernigan ................. 29/469
4,530,146  7/1985  Vere et al. ............... 29/723

FOREIGN PATENT DOCUMENTS 386110  9/1973  U.S.S.R. ................. 29/468

Primary Examiner—Howard N. Goldberg
Assistant Examiner—Steven Nichols
Attorney, Agent, or Firm—Pollock, Vande Sande & Priddy

[57] ABSTRACT

Device for inserting hair pin springs with two legs astride a plate having windows for locally welding the legs against one another. It comprises movable modules which receive one plate at a time in the vertical position and move it in the lengthwise direction for bringing it into successive positions each corresponding to the arrival of one of the spring reception zones in an insertion position where centering means temporarily hold the plate in said successive positions. A vibrating rail guides the springs to a take up position where a gripper takes each spring in turn by the end of one of its legs, then moves in a plane perpendicular to the plate along a path for introducing the other leg of the spring in the plate.

13 Claims, 14 Drawing Figures

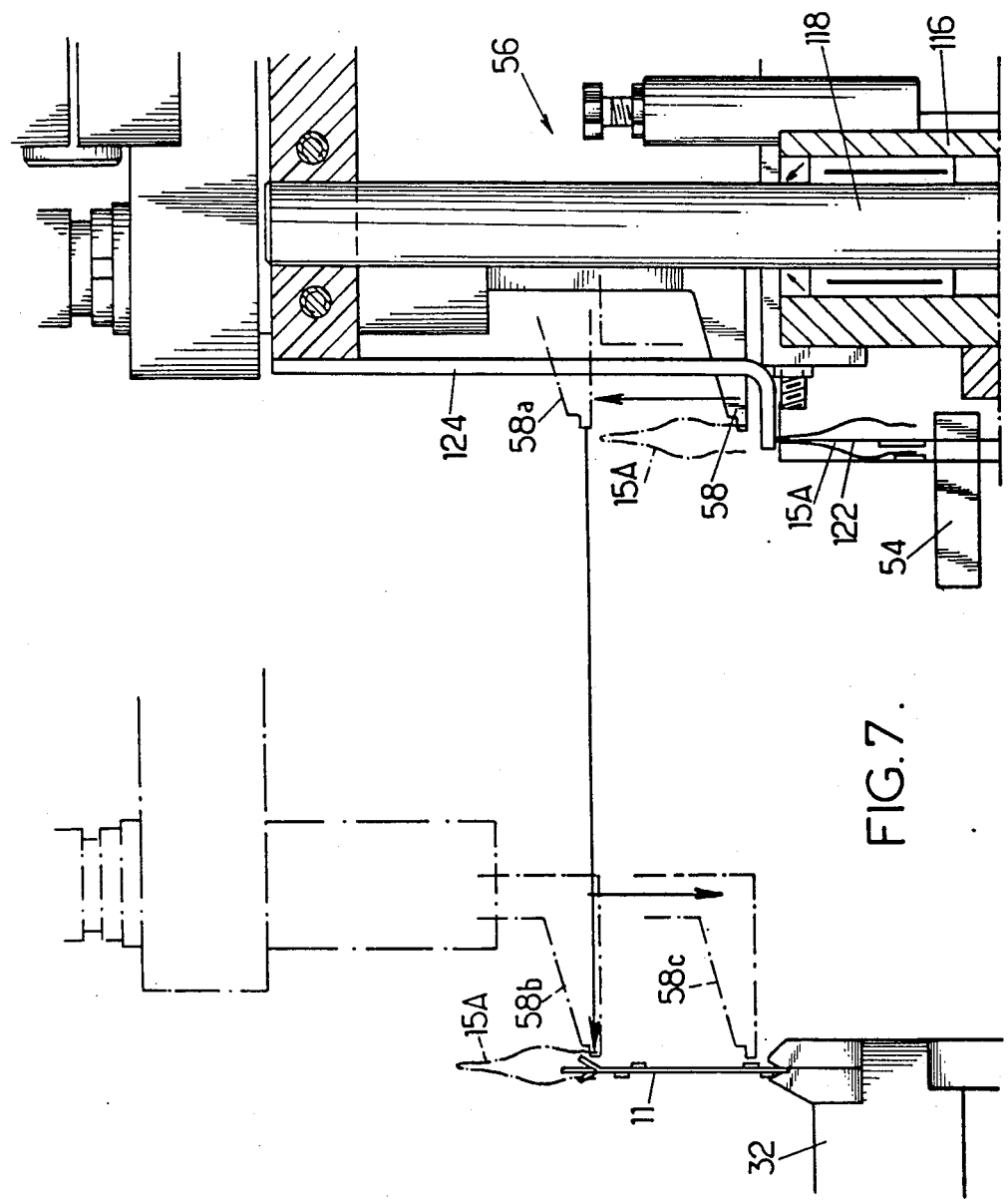

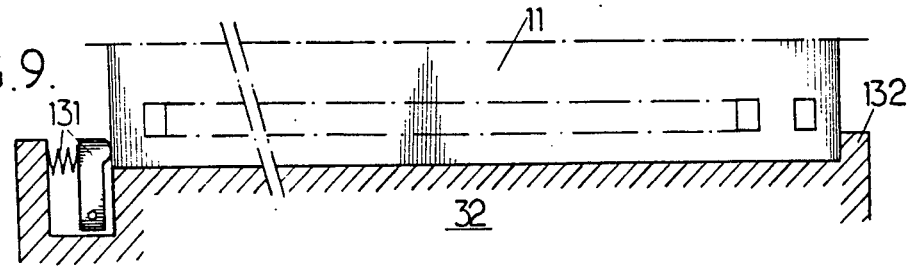
FIG.9.
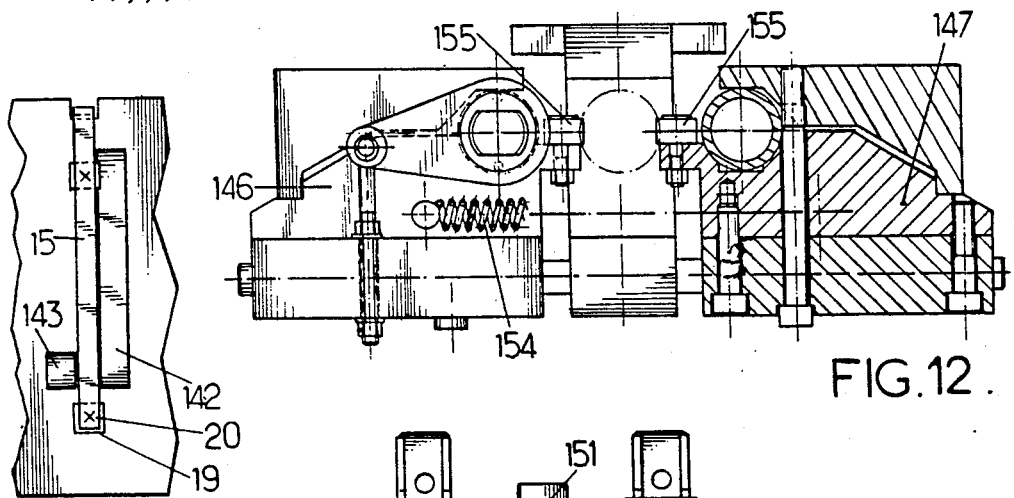
FIG.12.
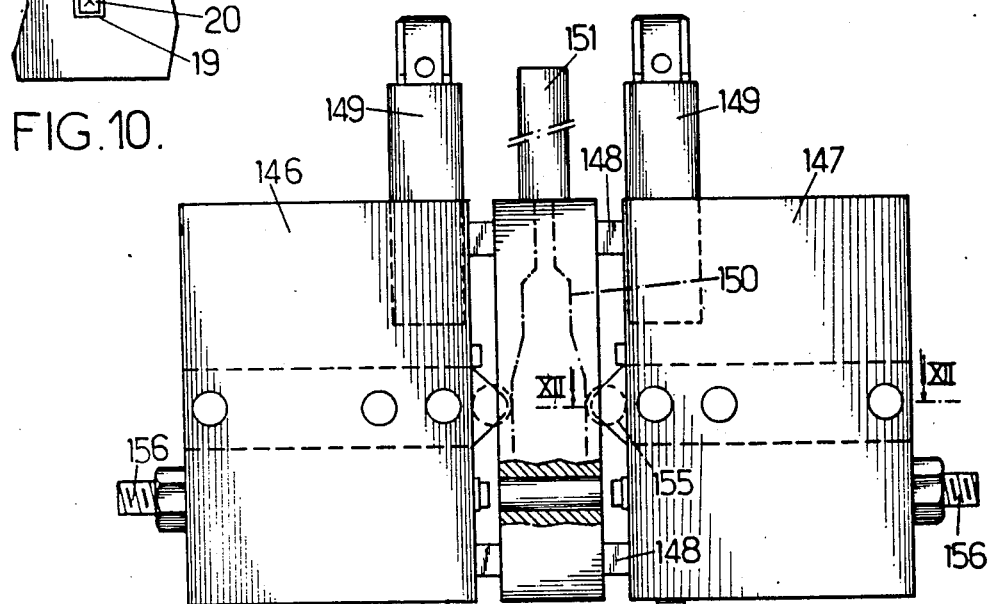
FIG.10.
FIG.11.

DEVICE FOR POSITIONING HAIR PIN SPRINGS ON PLATES, MORE ESPECIALLY FOR FUEL ASSEMBLY GRIDS

FIELD OF THE INVENTION

The invention relates to the positioning of hair pin springs for supporting the fuel rods in fuel assembly spacer grids.

BACKGROUND OF THE INVENTION

Fuel assemblies very frequently used comprise a bundle of fuel elements (each formed by a stack of pellets enclosed in a sealed sheath) held in position in a structure. This latter comprises grids spaced apart along the assembly and formed by plates disposed in two orthogonal directions, for defining cells through the major part of which elements pass. Each of these cells is provided with means bearing on the element which passes through the cell for supporting it.

These means may be formed by a part punched out from the plates forming lugs bearing against the elements. But it is more advantageous to use springs fixed to the plates, which may be made from a material different from the plates. A grid of this latter type is described, for example, in French Patent Application No. 2,474,229, to which reference may be made.

The springs in general have a hair pin shape with two legs. Generally, several types of spring are provided in the same grid because the grid has edges, and often some cells are occupied by elements other than fuel elements, for example by guide tubes. One of the types will frequently comprise two identical legs, whereas another type will have different legs. These springs are first of all inserted, then finally secured to the plates by welding the two legs to each other at well defined points, between which are located windows formed in the grid plate.

The positioning of each spring is a delicate operation: it is necessary to locate them accurately so as not to squeeze them on the plates during the welding operation, and so as to avoid any contamination. To date, the springs have been fitted and welded manually, which is a long and difficult operation, likely moreover to give rise to errors when springs of different types are to be placed in well defined zones of the plate. It is possible that one of the reasons for which this process has not been automated resides in the risk of the legs of the spring catching on the numerous projections of the plate during insertion of the spring whose legs are spaced apart by a distance which cannot be exactly defined because of their elasticity.

French Pat. No. 82 17717 further describes a process and device for positioning and welding hair pin springs. During this process, the plate is moved step by step so as to bring all the zones of the plate to be provided with springs successively into an insertion position where a spring is slid into place by moving along an orientation close to the plane of the plate, in a direction perpendicular to the length of the plate. So as to prevent the springs from catching in the windows, these latter must be covered with a mask during insertion. The mask is then removed for spot-welding of the legs of the spring through the windows.

Although this process has the advantage of being readily automatable, it has the drawback of being relatively slow, because of the time required for positioning then removing the masks. And in practice it is not possible to do without masks, for the introduction of springs into a horizontally placed plate involves considerable risks of the springs catching in the windows.

OBJECT OF THE INVENTION

It is an object of the invention to provide an improved spring positioning device. It is a more specific object to allow rapid and reliable positioning of the springs.

SUMMARY OF THE INVENTION

To this end, the invention provides a device for inserting hair pin springs with two legs astride a plate having windows for welding the legs locally to each other, characterized in that it comprises means for receiving one plate at a time in the vertical position, for moving it in the lengthwise direction, so as to bring it into successive positions each corresponding to the arrival of one of the spring reception zones in an insertion position, means for centering and temporarily holding the plate in said successive positions; means for guiding the springs to a pick up position; and a gripper for gripping each spring in turn by the end of one of its legs, associated with means for moving the gripper in a plane perpendicular to the plate along a path for introducing the other leg of the spring in the plate.

The device advantageously comprises electric gripper welding means acting on a spring when the corresponding reception zone is at the insertion position. If a high operating rate is desired, these clamp welding means are adapted for securing the legs of the spring through only one of the two windows which are generally provided. The means for moving the plate in the lengthwise direction are then associated with an additional welding station, for welding the two legs of the plate to each other through a second window.

BRIEF DESCRIPTION OF THE DRAWINGS

The invention will be more clearly understood from reading the following description of particular embodiments, given by way of examples, and illustrated in the accompanying drawings, in which FIG. 7 is an enlarged view, in elevation, along the line VII—VII of FIG. 4, showing the gripper for inserting the springs and the elements which are directly associated therewith, in the successive positions occupied during insertion of a double spring, FIG. 8, similar to a portion of FIG. 7, shows the movements which occur for inserting single springs, FIG. 9 is a schematic representation, in side view, of resilient means for maintaining a plate in abutment in a module, FIG. 10 is a schematic representation illustrating how a spring is centered with respect to the lower welding window in a particular embodiment of the invention, FIG. 11 is a side view, as seen from the left of FIG. 4, indicating a possible arrangment of the clamping station of the device, FIG. 12 is a side view in partial cross-section along line XII—XII of FIG. 11.

DETAILED DESCRIPTION OF PREFERRED EMBODIMENTS

Figure 1:
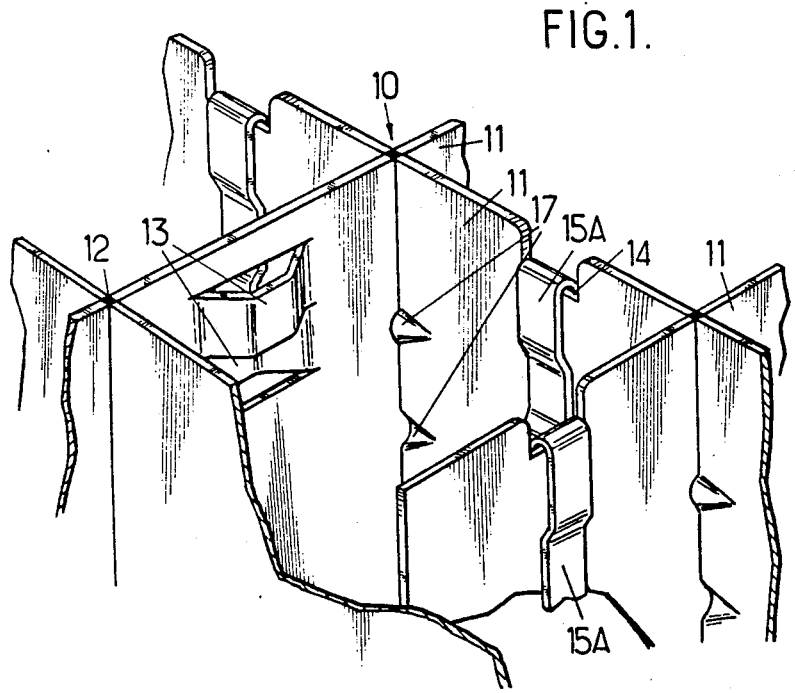
FIG. 1 is a perspective view of a fragment of a fuel assembly grid whose springs may be inserted by means of a device in accordance with the invention.

The device which will be described by way of examples may be used more especially for fitting the springs shown in FIGS. 3a and 3b to the plates of a grid of the kind shown in FIG. 1. This grid 10 is formed from plates 11, generally made from a zirconium based alloy such as "zircaloy", lap-jointed together and welded at their connection points 12.

Each of plates 11 comprises bosses 13 against which the fuel elements (not shown) bear and different apertures cooperating with the springs which apply the elements against the bosses. In FIG. 1 only the double springs 15a are shown which are inserted in indentations 14 formed in one of the edges of the plates.

Figure 2:
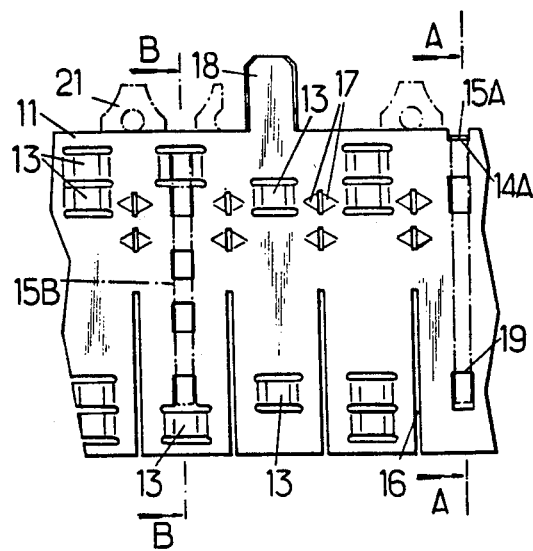
FIG. 2 is a detail view, showing, in elevation, a fragment of a plate of the grid shown in FIG. 1, with openings and deformations required for receiving the springs.

Referring to FIG. 2, there have been shown, schematically, different types of apertures and deformations which may be met with in a plate 11. In this figure can be seen slots 16 for the lap-joint assembly, placed opposite guide gaps defined by spurs 17. A vertical median strip of plate 11 which carries two bosses 13 turned to the same side is formed with a tongue 18 for fixing the grid to a guide tube (not shown) belonging to the framework of the assembly. On the left of this strip another one is shown having bosses 13 projecting on both sides of the plate, as shown on one of the sides of the complete cell seen in FIG. 1. An identical strip has been shown immediately to the right of the one which has a fixing tongue 18. Finally, the last strip on the right is provided with an indentation 14 for receiving a double spring 15a. The fins 21 shown in dot dash lines and appearing on one of the edges of the plate are provided only on some of the plates.

Figure 3A:
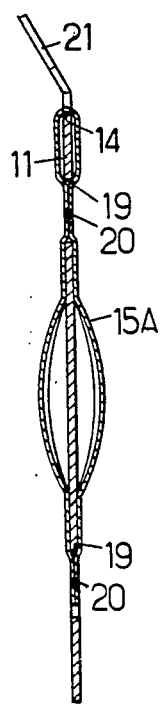
FIGS. 3a and 3b are views, respectively in section through lines A—A and B—B of FIG. 2, showing respectively a double spring (with two active legs) and a single spring (one leg of which forms a spring and the other forms an abutment)

Referring to FIG. 3a, each of springs 15a may be positioned by sliding its legs on each side of plate 11 until the upper loop of the spring comes into contact with the plate, at the bottom of the indentation 14. Windows 19 formed in the plate (FIGS. 2 and 3a) allow the two spring legs to be fixed directly to each other by means of a spot weld 20.

Figure 3B:
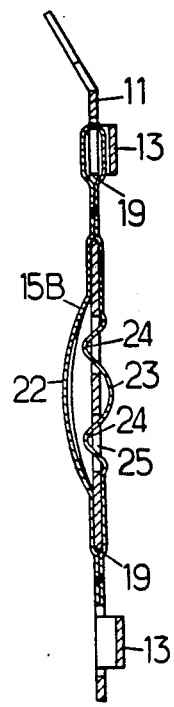

The single spring 15a shown in FIG. 3b is of a dissymmetrical construction. Its leg 22 is similar to the legs of spring 15a. The other leg 23 is designed so as to form a swivel joint defined by two bends 24 adapted for contacting leg 22 through openings 25 in the plate so as to avoid transmitting the compression forces of this latter. As in the preceding case, the two legs of spring 15b are welded to each other through the windows 19 in the finished grid. But the loop does not come into position at the bottom of the indentation, but in an extension of the upper window 19, formed by one of bosses 13. It is therefore not possible to cause the legs 22 and 23 to pass directly on each side of the plate.

Elimination of the indentation, troublesome in so far as insertion of the spring is concerned, is frequently indispensable, for the indentation would excessively weaken the plate at a position where it already comprises bosses 13 which have an important role in supporting, but an unfavorable effect on the strength of the plate.

Figure 4:
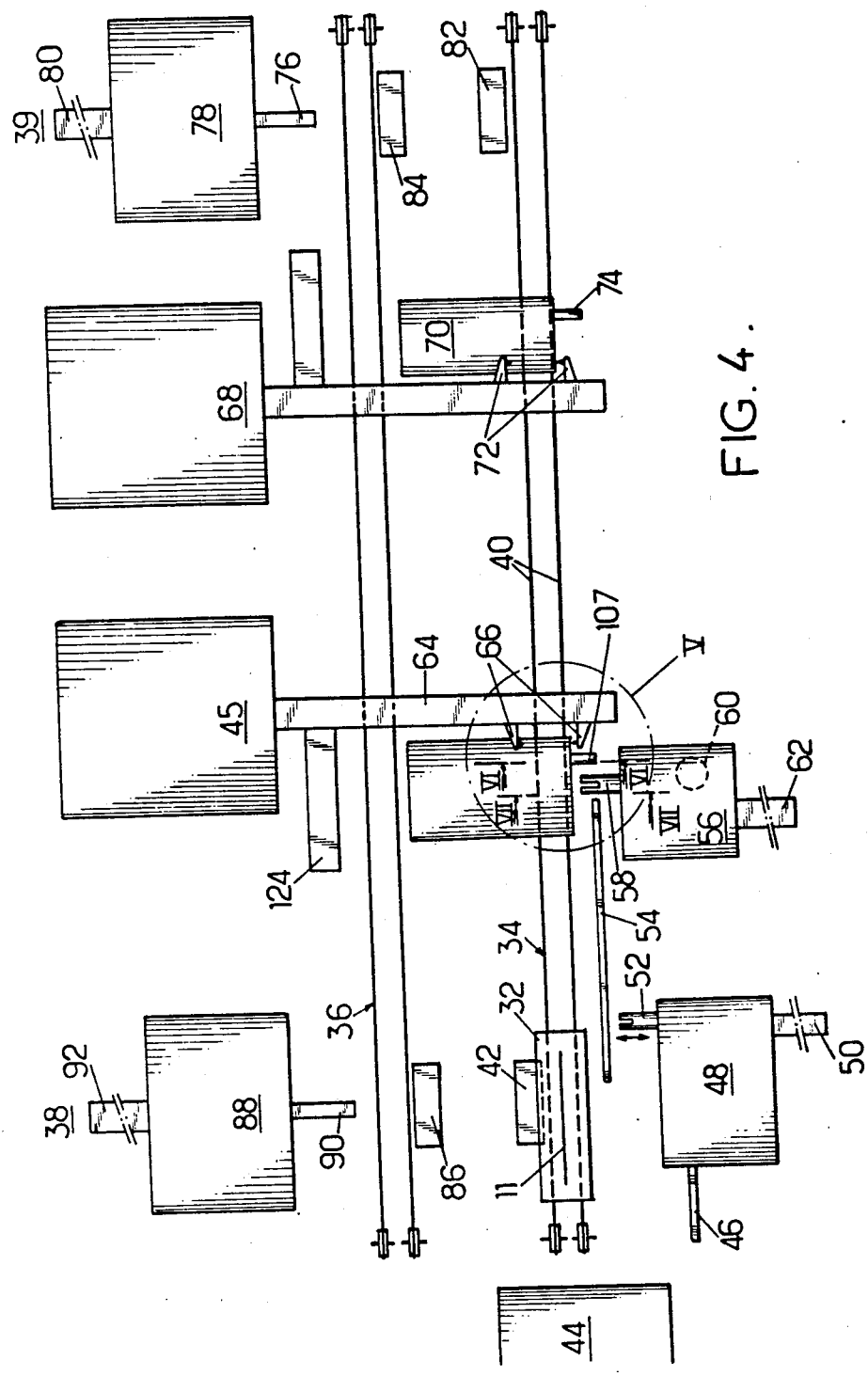
FIG. 4 is a simplified diagram, seen from above, showing the distribution of the work stations of a spring fitting device according to one embodiment of the invention.

The fitting and welding device whose general diagram is shown in FIG. 4 may be regarded as formed of several stationary stations, ensuring the successive operations, and a mechanism for transporting the plates to be equipped and presenting the plates at the successive stations.

The transport mechanism is provided for transporting the plates 11 on individual modules 32 which hold them in the vertical position. This mechanism comprises a supply path 34, a return path 36 parallel to the preceding one and two transfer mechanisms 38 and 39.

Each path is formed from two belts 40 supported by idler pulleys and drive pulleys driven by a step by step electric motor (not shown).

The module transfer mechanism 38 comprises a raising-lowering mechanism 42 situated at the initial part of path 34 and allowing a module to be raised above the path or, on the contrary, to be placed on the path.

Each module 32 (FIG. 6a) comprises a slit for receiving the lower part of the plate 11 and retractable studs spaced apart at the same pitch as the spring reception zones, 17 in number, for example. Before positioning a module from a handling station 44, the operator places those of said studs which correspond to the zones to be equipped with a spring of given type in projecting relation.

The first work station placed on the supply path 34 is formed by a station for centering and holding plates in position between clamping jaws, which station is associated with a welding machine 45 and with a spring supply and insertion assembly. The spring supply assembly comprises a spring magazine 46 intended to receive spring strips, shears 48 which cut the springs and a gripper 52 actuated by a hydraulic cylinder 50 which brings them one by one on a vibrating rail 54 guiding the springs to a take up position. It further comprises a handler 56 having a gripper 58 for gripping each spring 15a or 15b in turn and placing it on the plate 11 while this latter is held stationary so that the zone to be equipped is in a fixed and well defined insertion position. The handling gripper 58 is movable vertically by a cylinder 60 and horizontally, transversely to the plane of plate 11, by a hydraulic cylinder 62.

The welding machine 45 may be of the electric spot welding tong type described in French Pat. No. 82 17717. FIG. 4 also shows the beam 64 supporting welding jaws 66 which may be moved apart and toward each other. A hydraulic cylinder 67 (FIG. 5) is actuatable to close the jaws and clamp the legs of the spring against each other and to free the legs.

The welding machine 45 is adapted for effecting only the upper weld for fixing each spring 15a or 15b. Thus, the speed for fitting a plate is not retarded by the time required for two successive welding operations. A second welding machine 68, similar to the first one, also associated with a station 70 for temporarily clamping the module, is placed downstream of the first one in the supply path 34. A hydraulic cylinder of the welding machine 68 causes the legs of the spring situated in a advance of the module by the number of steps required, is controlled by a detector which causes the module to stop whenever a stud appears projecting from the side face of the module.

Once all the first welds have been effected on plate 11 borne by module 32, the module is driven by belts 40 to the second clamping station 70. The welding machine 68 then carries out a second welding operation on each spring, through the lower window 19 in the plate, which means that the welding electrodes carried by jaws 72 are at a lower level than those of the first machine 45.

Finally, when all the welds have been formed, the module 32 is taken over by the belts 40 and travels over the rest of the supply path 34, then the return path 36. The transfer mechanism 38 brings the module onto the raising-lowering mechanism 42 where the operator removes the equipped plate and replaces it by a blank plate.

It can be seen then that the plates are thus equipped continuously, several modules being in paths 34 and 36 at the same time, thus forming a continuous chain. Programming the modules by means of the studs allows different spring distributions on successive plates.

In addition, the device of the invention allows a plate to be repaired by replacing a spring whose welding is defective, through the programming of the modules provided by the studs.

There will now be described, as a particular embodiment, a possible arrangement of the clamping station 70 which makes it possible to provide the individual modules 32 with slits for receiving the plates 11 which have a length higher than the length of the plate. Such an overlength makes insertion of the plates easier. An overlength of 0.5 mm will typically be used.

The resulting gap is of no consequence as regards the higher weld 20 (FIG. 3a) since the plate 11 is centered and maintained in the centering and clamping station during the steps of spring insertion and welding.

On the other hand, the overlength may be detrimental if the spring is not exactly centered with respect to the lower window 19 when making the lower weld 20. And the legs of springs 15A and 15B (which will be designated as a whole by reference 15) may rotate about the upper weld during movement of the module 32 and they may take a position offset with respect to the vertical position. Then, there is a possibility that the legs may be welded onto the plate, on both sides of the plate, when making the lower weld 20. Then the plate should be rejected or repaired.

For overcoming the difficulty, the clamping station 70 may be provided with means for indexing the lower portion of the legs of each spring with respect to the plate. Referring FIGS. 9-10, there is shown a preferred arrangement of such means.

Referring to FIG. 9, a module 32 comprises a positioning device comprising an abutment 132 and a spring loaded lever 131. The compression force of spring 131 may be low since it is only for assisting movement of plate 11 toward abutment 132 when the module 32 is stopped at the temporary clamping station 70. The spring loaded lever 131 also repositions plate 11 after welding.

Station 70 comprises an abutment strit 203 contacted by module 32 when at station 70. Referring to FIGS. 11 and 12, the stationary parts have not been illustrated. Only the welding jaws of the welding means have been shown.

The indexing means comprises two forks 140 and 141 of similar construction. Each fork has a long jaw 142 and a short jaw 143 (FIG. 10). The forks are actuatable by a mechanism which is carried by the frame of the device (not shown). That mechanism may include two plates 146 and 147 slidably received on stationary shafts 148 for movement away and toward each other. Closing movement of the plates for clamping the plate between the forks 140 and 141 is achieved by a spring 154 (FIG. 12). The plates may be spread apart by a cam 150 driven by a jack 151. Plates 146 and 147 are provided with rollers 155 maintaining contact against the cam by spring 154. Threaded rods 149 are provided for adjusting the level of forks 140 and 141 (FIG. 11). Additional threaded rods 156 are provided for determining the maximum extent of outward movement of the forks (FIG. 11).

Referring to FIG. 10, the longer jaw 142 of each fork extends over the greater part of the length of a spring 15. The surface of the jaw 142 confronting the spring has a slope with respect to the vertical direction. As an example, indexing means were constructed wherein the width of the higher portion of jaw 142 was 0.15 mm greater than the width of the lower portion. Each spring 15 is centered after the module 32 has been brought to a stop and before the strip 203 is moved into abutting position and welding is carried out. For that purpose, jack 151 is actuated for authorizing closer movement of forks 140 and 141 under the action of spring 154. Due to the slope of jaw 142, the closing movement of the forks forces the upper loop of spring 15 into abutment against one of the edges of window 14. Upon continuing movement of the forks, plate 11 is forced rearwardly out of contact with abutment 132. The lower portion of jaw 142 cooperates with the short jaw 142. Each fork consequently retains one of the legs of spring 15 in front of window 19. The welding jaws 72, located under the centering forks 140 and 141 are then actuated for welding through the lower window. As soon as welding has been achieved, the welding clamps are opened by actuation of jack 151. The spring loaded lever 131 then forces plate 11 into abutment.

We claim:

1. A device for inserting hair pin springs having two legs astride a plate having windows for welding the legs one against the other locally across the window, comprising: means for receiving one plate at a time in vertical position and moving it lengthwise to successive positions each corresponding to the arrival of one of spring reception zones of said plate in an insertion position; means for centering and temporarily holding said plate in each of said successive positions; means for guiding hair springs to a take-up position; gripper means for gripping each spring in turn by the end of one of its legs; and drive means associated with said gripper for moving it in a plane perpendicular to the plate along a path toward the plate and then substantially parallel to the plate for introducing the other leg of the spring onto the plate at one of said reception zones.

2. Device according to claim 1, further comprising electric welding clamping means associated with said centering and insertion means and arranged for squeezing and welding each spring in turn at that reception zone which is in the insertion position.

3. Device according to claim 2, wherein said welding clamping means are provided so as to weld the legs of the spring together only through a single one of two windows.

welding position between the electric welding jaws 72 to be clamped against each other, through the lower window 19. A hydraulic cylinder 74 is provided for indexing step by step the module placed in station 70.

The transfer mechanism 39, placed downstream of station 70, is intended to cause each module 32, carrying an equipped plate, to pass from path 34 to path 36. This transfer mechanism comprises a handling unit 78 having a gripper 76 whose horizontal movements are controlled by cylinder 80. The gripper 76 grips the module 32 in a lifting and lowering station 82 and places it in a similar lifting and lowering station 84 associated with the return path 86. Station 84 places the module 82 on the return path 36 of the equipped plates.

The return path brings the module 32 close to the handling station 44 where it comes alongside a lifting and lowering device 86 similar to devices 82 and 84. Device 86 belongs to the transfer mechanism 38 comprising a handling unit 88 similar to unit 78 and also comprising a gripper 90 and an actuating cylinder 92. Gripper 90 moves the module 32 horizontally and positions it on the mechanism 42, after a module 32 equipped with a blank plate has freed this latter.

The operator in the handling station 44 may take hold of the completely equipped plate brought by module 32, remove the plate and replace it with a plate to be equipped.

The centering and clamping station will now be described in detail with reference to FIGS. 5, 6a and 6b. This station comprises a fixed frame on which a left hand jaw 94 (FIG. 6a) and a right hand jaw 96 (FIG. 6b) are mounted by means of respective pivots 98 and 100 parallel to the moving direction F of module 32 along path 34. The jaws are shown with broken lines in their retacted position, allowing movement of module 32, and with a continuous line in the clamping position. The frame comprises a sensor (not shown) for detecting the arrival of a projecting stud on module 32 at the spring insertion position.

Jaw 94 is provided with a stud 101 for locking module 32 when the jaw is closed. This stud cooperates with a bar 102 formed in module 32 so as to have a hardened interchangeable surface.

Figure 5:
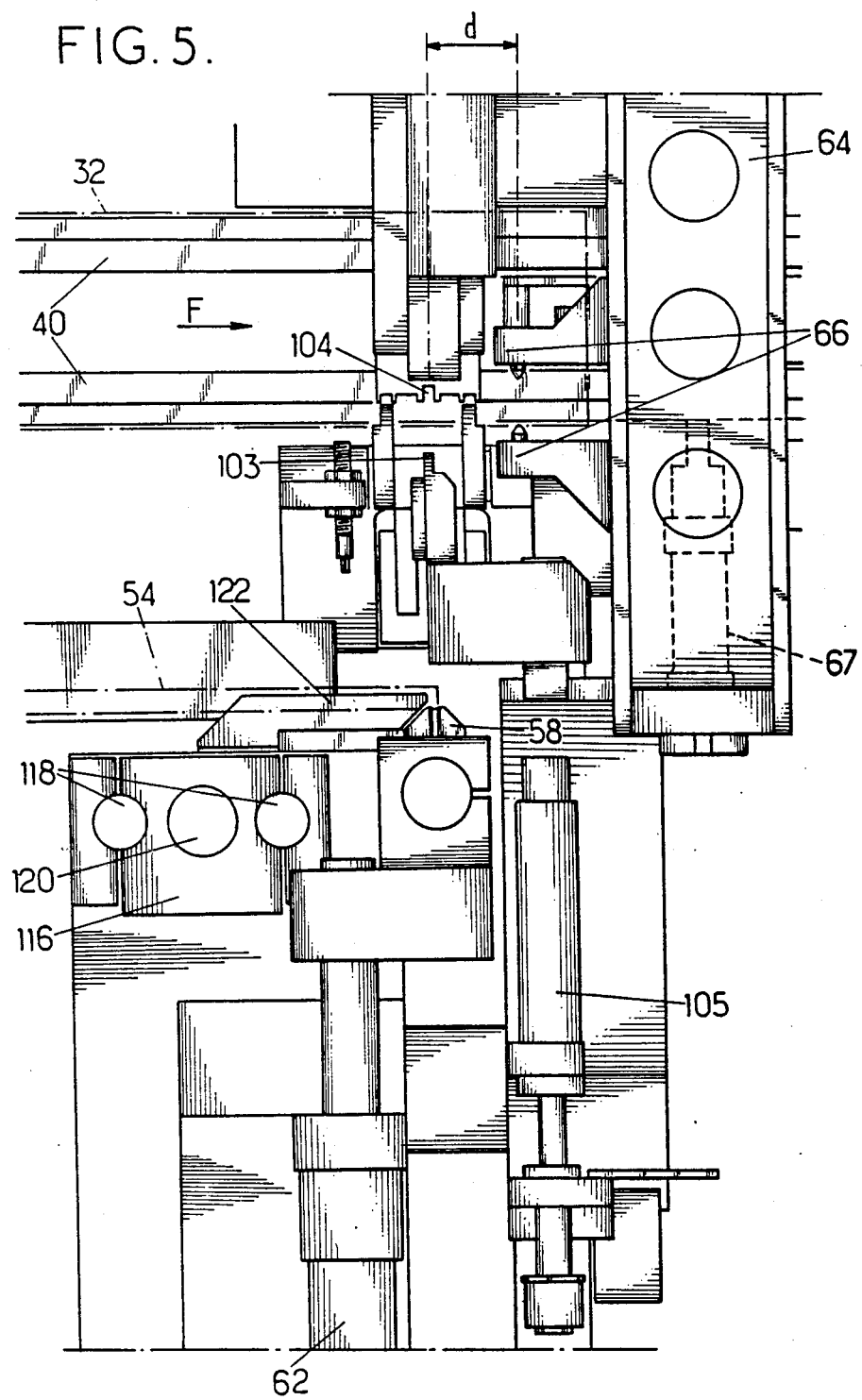
FIG. 5 is an enlarged view of the portion of FIG. 4 contained in the circle V.

The device for centering plate 11 in the insertion position comprises a centering finger 103 which a reciprocating mechanism 105 moves along the frame between a retracted position, in which it is shown in FIG. 5, and an advanced position, in which the stud is engaged in an oppositely situated housing 104, through a window in a plate. The step by step indexing of the module after each fitting of the spring is controlled by a hydraulic cylinder 107.

Figure 6A:
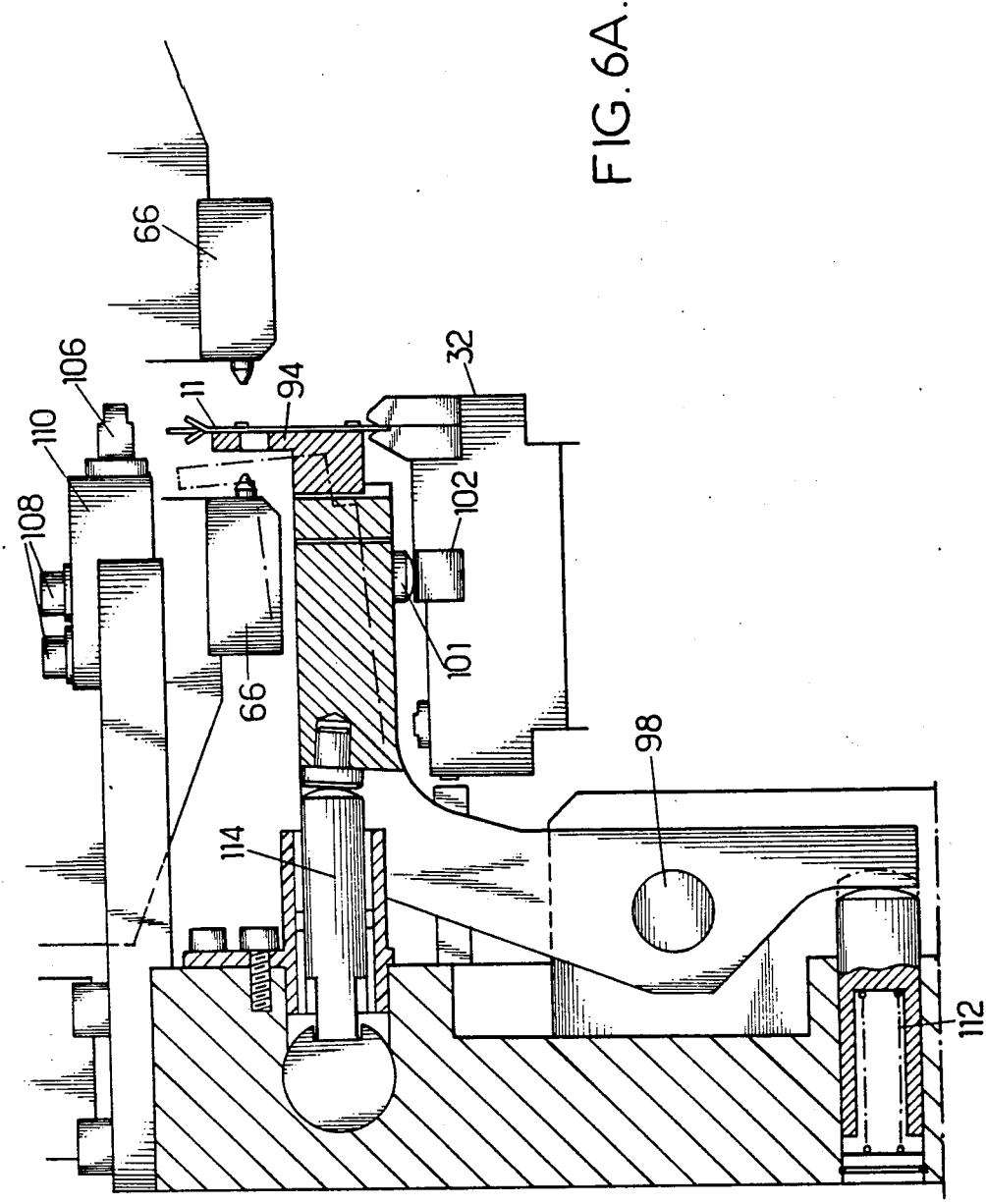
FIGS. 6a and 6b are enlarged views, in elevation, showing the left and right hand parts of the means for centering and holding the plate in the insertion position, through line VI—VI of FIG. 4.
Figure 6B:
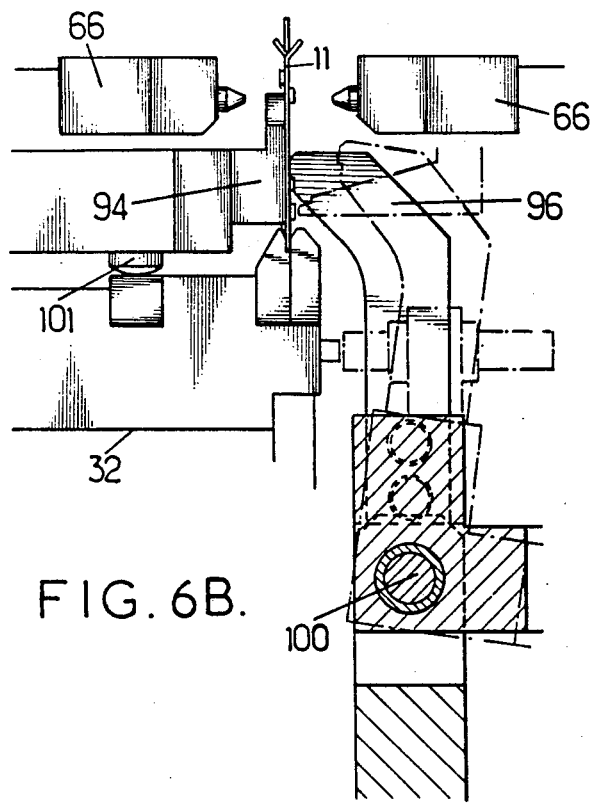

FIG. 6a shows a wedge 106 carried by a flange 110 fixed to the frame by screws 108. The flange is only used for fitting a plate with disymmetrical springs 15b. The wedge 106 which it carries, situated in line with the position on plate 11 to be equipped, guides the springs during insertion thereof, as will be seen further on. In fact, the wedge gives to the leg of spring 15b an orientation allowing them to be fitted into the openings situated below the bosses 13. Flange 110 is removed for positioning springs 15a which are positioned astride in the indentations 14 in plate 11.

Jaws 94 and 96 are provided with springs for returning them to the open position (112 in FIG. 6a). Closure thereof is controlled by respective pushers actuated by cylinder and cam (114 in FIG. 6a).

The main components of the spring supply and insertion handler 56 appear in FIG. 7, where the spring shown is a double spring 15a. These components comprise a carriage 116 which slides over vertical columns 118 under the action of a cylinder 120 (FIG. 5). Carriage 116 has a separator 122 which raises one spring at a time vertically from the vibrating guide rail 54 to a level where it is taken up by the gripper 58. A fixed cover 124 prevents two springs from being raised at one time.

Cylinder 60 moves the gripper 58 from the low position, where it is shown with a continuous line in FIG. 7 and may pick up a spring, in the high position shown at 58a. In this position of the gripper, spring 15a is at a level just a little higher than that of plate 11. Cylinder 62 then moves the gripper horizontally so as to bring it to position 58b. The spring 15a is then just above the position of the plate where it is to be introduced. Cylinder 60 lowers the gripper to 58c for fitting the spring.

Figure 8:
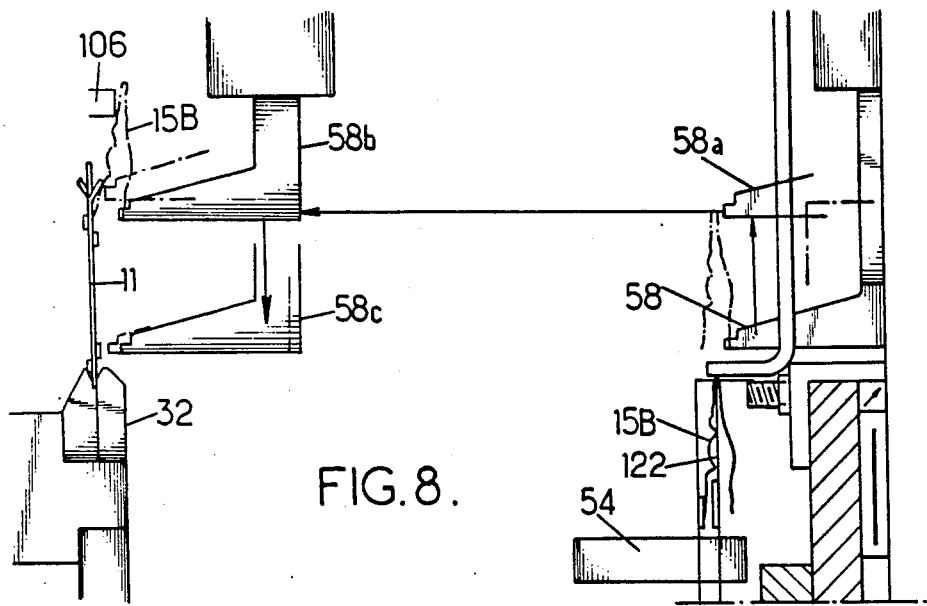

Cylinders 60 and 62 are provided so that the path taken by the gripper is slightly different from the preceding one in the case where the springs to be inserted are dissymmetrical springs 15b. FIG. 8 shows with a continuous line the successive positions 58, 58a, 58b and 58c assumed by the gripper, which may be compared with those (shown with dot dash lines) during insertion of the springs 15a.

The operation of the device which has just been described will only be briefly mentioned, for it is clear from the foregoing description.

The operator first of all provides a module 32 with a plate to be equipped and programs the studs depending on the positions where springs of a given type are to be introduced. A strip of springs of the type to be inserted is placed in the magazine 46.

Operation then takes place automatically. The shears 48 cut each spring individually which the gripper 52 places astride the vibrating guide rail 54. The module, placed by the operator on mechanism 42, is lowered by this latter to the supply path 34. The motor driving belts 40 drive the module as far as the centering and holding station. The centering stud 103 advances and exactly centers the plate. The first hinged jaw 94 is applied to the left hand face of plate 11. Jaw 96 is, in its turn, actuated and is applied to the right hand face of plate 11. The centering finger 103 moves back. Gripper 58 takes up a spring to be inserted and introduces it. When the plate is to be equipped with single springs 15b, wedge 106 is positioned beforehand. Gripper 58 then raises the spring only as far as the position corresponding to the height of the opening under the bosses 13 of plate 11. The combined action of gripper 58 and wedge 106 orientates the spring 15b obliquely with respect to the plate, which allows the leg of the spring not held by the gripper 58 to slide into the opening when the gripper moves down. (FIG. 8).

As soon as the spring has been positioned, the beam 64 of the welding machine is moved leftwards over the distance D (FIG. 5) by its cylinder 124 (FIG. 4). The jaws 66 are brought together so that the welding electrodes are applied to the legs, and press them against each other. Gripper 58 is removed. The two legs are welded to each other at their upper part through window 19. The successive springs are thus positioned and welded. After welding of each spring, module 32 is advanced by cylinder 107 which controls a rod acting on a track formed by teeth machined in the lower face of module 32. Operation of cylinder 107, and so the 4. Device according to claim 1, wherein the means for moving the plates comprise a supply conveyor having belts for driving said means each carrying one plate and means for advancing said plate carrying means with respect to the centering and holding means by steps equal to the distance between two spring receiving zones.

5. Device according to claim 4, wherein the means for moving the plates further comprise a return conveyor for bringing back the plate carrying means after they have received springs to a position close to their starting point and a transfer mechanism for transferring one of said plate carrying means at a time from the return path to a starting zone of the supply path.

6. Device according to claim 4, wherein said plate carrying means constitute a module comprising a slot for receiving the lower part of a plate and carrying retractable studs spaced apart at the same pitch as the spring reception zones on said plates.

7. Device according to claim 1, wherein the spring guiding means comprise shears for cutting individual springs from a spring strip, a gripper for bringing successive of said springs onto a vibrating rail guiding the springs to a take-up position and a separator for raising one spring at a time, placed astride the vibrating rail, to a position where it is taken up by the spring insertion gripper.

8. Device according to claim 1, wherein the spring insertion gripper is provided with actuating cylinders for raising one spring at a time up to a higher level to the insertion position in the plate, then moving it horizontally and finally leaving it for insertion.

9. Device according to claim 8, wherein said cylinders and insertion gripper are associated with control means giving to the gripper a different path depending on whether the spring is to be inserted in an indentation in the upper edge of the plate or fitted through a window formed in the plate.

10. Device according to claim 9, further comprising a removable wedge placed so as to come into abutment against the top part of the springs when they are brought by the insertion gripper and to give thereto a slant required for introducing them through the window in the plate.

11. Device according to claim 1, wherein said means for moving the plates are associated with second welding means for welding the two legs of the spring one to the other through a second one of said windows.

12. Device according to claim 11, wherein said second welding means are associated with centering means having two forks movable toward and away from each other, said forks being constructed and arranged for straddling each one leg of one of said springs and forcibly indexing it about a first weld for mutual alignment of said legs on both sides of said second window upon movement of said forks toward each other.

13. Device according to claim 12, wherein said means for receiving one plate at a time comprises a module having a slit for receiving one of said plates with a longitudinal clearance and resilient means for longitudinally biasing said plate into longitudinal abutment, said resilient means being dimensioned for yielding under the action of said forks.

* * * * *

UNITED STATES PATENT AND TRADEMARK OFFICE
CERTIFICATE OF CORRECTION

PATENT NO. : 4,646,431

DATED : March 3, 1987

INVENTOR(S) : Bernard Vere and Paul Mathevon

It is certified that error appears in the above-identified patent and that said Letters Patent is hereby corrected as shown below:

On the title page assignee should read

-- (73) Assignee: Societe Cogema, Framatome et Uranium Pechiney --.

Signed and Sealed this

Tenth Day of May, 1988

Attest:

DONALD J. QUIGG

Attesting Officer      Commissioner of Patents and Trademarks